(12) United States Patent
Videt et al.

(10) Patent No.: US 8,416,594 B2
(45) Date of Patent: Apr. 9, 2013

(54) POWER CONVERTER WITH A CONTROLLED CURRENT SOURCE AND CONNECTED IN SINGLE-PHASE MODE

(75) Inventors: Arnaud Videt, Villeneuve d'Ascq (FR); Hocine Boulharts, Triel Sur Seine (FR)

(73) Assignee: Schneider Toshiba Inverter Europe SAS, Pacy sur Eure (FR)

( * ) Notice: Subject to any disclaimer, the term of this patent is extended or adjusted under 35 U.S.C. 154(b) by 0 days.

(21) Appl. No.: 13/277,639

(22) Filed: Oct. 20, 2011

(65) Prior Publication Data

US 2012/0134183 A1    May 31, 2012

(30) Foreign Application Priority Data

Nov. 25, 2010  (FR) .................................. 10 59732

(51) Int. Cl.
*H02M 7/00*   (2006.01)
*G05F 1/613*  (2006.01)

(52) U.S. Cl. ........... 363/82; 323/225; 323/285; 363/125

(58) Field of Classification Search .................... 363/81, 363/82, 125–129; 323/222, 225, 282–285, 323/351

See application file for complete search history.

(56) References Cited

U.S. PATENT DOCUMENTS

| | | | |
|---|---|---|---|
| 7,167,383 B2 * | 1/2007 | Iwakura et al. | 363/89 |
| 7,433,212 B2 * | 10/2008 | Igarashi et al. | 363/37 |
| 8,159,848 B2 * | 4/2012 | Morimoto et al. | 363/127 |
| 8,223,517 B2 * | 7/2012 | Kishida et al. | 363/67 |
| 2008/0284385 A1 | 11/2008 | Namuduri et al. | |
| 2010/0014333 A1 * | 1/2010 | Shimada et al. | 363/126 |
| 2010/0052648 A1 * | 3/2010 | Iwabuchi et al. | 323/351 |
| 2011/0057587 A1 | 3/2011 | Baudesson et al. | |

FOREIGN PATENT DOCUMENTS

| | | |
|---|---|---|
| EP | 1 919 064 A2 | 5/2008 |
| WO | WO 2009/147186 A1 | 12/2009 |

OTHER PUBLICATIONS

U.S. Appl. No. 13/276,542, filed Oct. 19, 2011, Videt, et al.
French Search Report issued Mar. 25, 2011, in Patent Application No. FR 1059732, filed Nov. 25, 2010 (with English Translation of Category of Cited Documents).

* cited by examiner

*Primary Examiner* — Jessica Han
(74) *Attorney, Agent, or Firm* — Oblon, Spivak, McClelland, Maier & Neustadt, L.L.P.

(57) ABSTRACT

A control method implemented in a power converter, such as a variable speed drive, is disclosed. This control method is designed to make the power converter operate when the latter is connected to the network in single-phase mode. The power converter includes a controlled current source connected in series to its DC power supply bus. This controlled current source includes an electronic converter provided with two controlled switching arms. The switching arms are controlled by alternating a modulation phase with a saturation phase, the saturation phase being applied for a determined duration β in order to make the power converter operate in discontinuous mode.

5 Claims, 2 Drawing Sheets

POWER CONVERTER WITH A CONTROLLED CURRENT SOURCE AND CONNECTED IN SINGLE-PHASE MODE

BACKGROUND OF THE INVENTION

1. Field of the Invention

The invention relates to a power converter connected in single-phase mode. The invention applies more particularly to a power converter provided with a controlled current source.

2. Description of the Related Art

As is known, a power converter includes a number of input phases connected to the network, for example three input phases if it is connected in three-phase mode or two input phases if it is connected in single-phase mode. Connected to its input phases, a power converter includes a rectifier stage for transforming the AC voltage supplied by the network into a rectified voltage. The converter also includes a power supply bus provided with a first power supply line with positive potential and a second power supply line with negative potential to which is applied the rectified voltage and a bus capacitor connected between the first power supply line and the second power supply line and intended to keep the DC voltage on the bus constant.

It is known practice to place a controlled current source in series on the first or second power supply line of the DC bus, upstream of the bus capacitor. This current source includes, for example, an inductance and an electronic converter connected in series, said electronic converter having two parallel switching arms and a capacitor. The switching arms of the electronic converter are controlled to modulate the voltage at the terminals of the capacitor of the electronic converter in order to obtain, at each instant, a determined voltage at the terminals of the electronic converter, thus making it possible to control the current at the output of the rectifier stage, called rectifier current, and to act on the input current supplied by the network.

When such a power converter is connected to the network in three-phase mode, its electronic converter is controlled in modulation in a so-called continuous operating mode which is applied to the rectifier stage and in which the voltage at the terminals of the capacitor of the converter must always satisfy the following condition:

$V_C \geq \max|V_r(t) - V_{bus}(t)|$ with $V_r(t) = V_{red}(t)$ and $<V_{bus}> = <V_{red}>$, in which:

$V_r(t)$ is the theoretical rectified voltage of the network. When the rectifier stage is conducting, the voltage $V_r$ is the same as the real rectified voltage $V_{red}$.

<Vbus> is the average voltage of the bus and <Vred> the average voltage at the output of the rectifier stage.

Thus, it is possible to guarantee a constant rectifier current. In this mode of operation, the voltage of the DC power supply bus will be 95.5% of the peak voltage applied at the output of the rectifier stage.

On the other hand, when this power converter is connected to the network in single-phase mode, this continuous operating mode is not applicable because the voltage of the DC power supply bus is then 63.7% of the peak voltage of the network. As it happens, this voltage level cannot be used to control a motor.

BRIEF SUMMARY OF THE INVENTION

The aim of the invention is therefore to propose a method for controlling a power converter connected to the network in single-phase mode and including a controlled current source as described above.

This aim is achieved by a power converter comprising:

a rectifier stage connected to a number of input phases of a network delivering an input current and to which is applied a rectified voltage and at the output of which is obtained a current, called rectifier current, a DC power supply bus connected to the rectifier stage and including a first power supply line and a second power supply line to each of which is applied an electrical potential in order to obtain a voltage on the DC power supply bus, a bus capacitor connected to the first power supply line and to the second power supply line, a controlled current source situated on the first power supply line or the second power supply line, upstream of the bus capacitor, said controlled current source including an inductance and an electronic converter including a capacitor and two switching arms, control means for controlling the two switching arms of the electronic converter to modulate a voltage at the terminals of the capacitor in order to obtain, at each instant, a determined voltage at the terminals of the electronic converter, the control means being arranged to obtain a discontinuous operating mode of the rectifier stage by alternation of a modulation phase of the switching arms with a saturation phase in which the two switching arms are simultaneously kept conducting, said saturation phase being applied for a determined duration so as to keep the voltage at the terminals of the capacitor of the electronic converter below the maximum absolute value of the difference between the rectified voltage and the voltage applied to the DC power supply bus and to increase the average value of the voltage applied to the DC power supply bus.

According to a particular feature, the control means are arranged to implement a regulation loop intended to determine a control of the switching arms of the electronic converter.

According to another particular feature, the duration of the saturation phase is determined on the basis of the following relationships:

$$\theta = \frac{I_L}{I_{redm}} \cdot \frac{\pi}{2 \cdot n} \text{ and } \beta = \pi/n - 2\theta$$

in which θ represents the duration of the modulation phase, β represents the duration of the saturation phase, n corresponds to the number of input phases to which the power converter is connected, $I_L$ is the current flowing on the DC power supply bus, downstream of the bus capacitor, $I_{redm}$ corresponds to the peak rectifier current.

According to another particular feature, the $$\theta < \frac{\pi}{2 \cdot n}.$$

discontinuous operating mode is obtained when

The invention also relates to a variable speed drive including an inverter stage provided with switching arms intended to convert a DC voltage into a variable voltage intended to power an electric load, this variable drive including, upstream of its inverter stage, a power converter as defined above.

BRIEF DESCRIPTION OF THE DRAWINGS

Other features and advantages will become apparent from the following detailed description, with reference to an embodiment given by way of example and represented by the appended drawings in which.

DETAILED DESCRIPTION OF THE INVENTION

Figure 1:
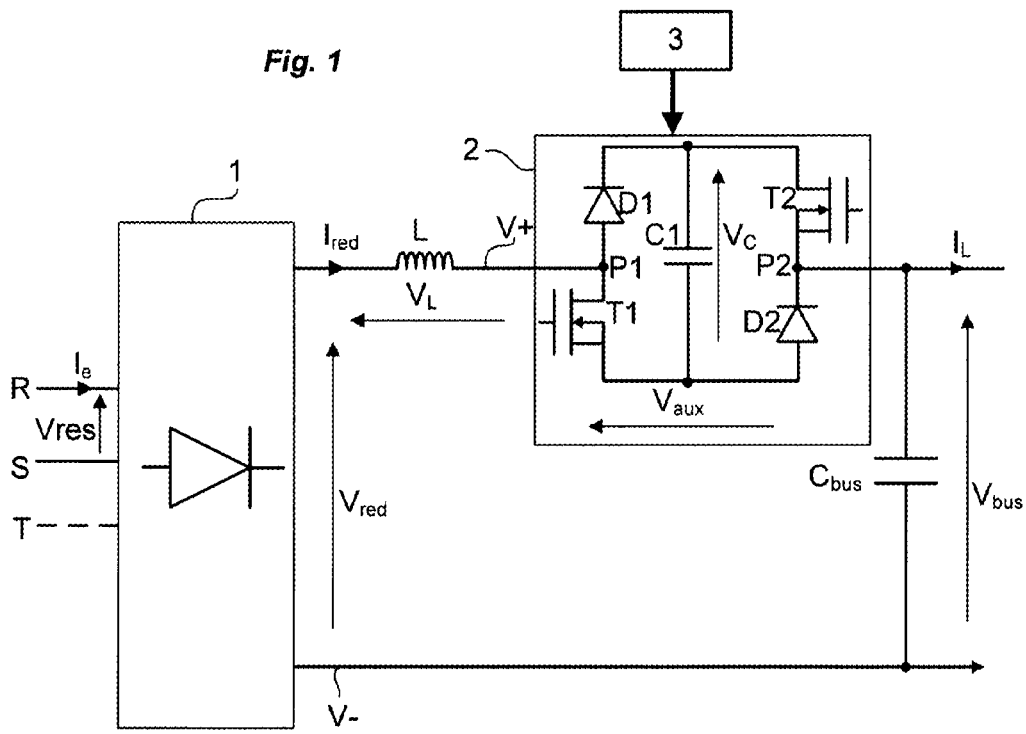
FIG. 1 represents a power converter conforming to the invention.

Referring to FIG. 1, as is known, a power converter includes a rectifier stage 1 and a DC power supply bus. With reference to FIG. 1, the rectifier stage 1 is connected to the network, for example via AC inductances on two or three input phases R, S, T (the phase T is shown in dotted lines to illustrate the connection in three-phase mode or in single-phase mode of the converter). In this FIG. 1, the rectifier stage 1 is, for example, a diode bridge for rectifying the AC voltage $V_{res}$ supplied by the network and applying the rectified voltage $V_r$ to the DC power supply bus. More specifically, the rectifier stage 1 includes a number of arms each consisting of two diodes in series, each arm being connected to an input phase R, S, T by the mid-point situated between the two diodes.

The DC power supply bus is connected downstream of the rectifier stage 1. It includes a power supply line with positive potential V+ and a power supply line with negative potential V−. At least one bus capacitor $C_{bus}$ is connected to each of the two power supply lines of the bus and is used to keep the bus voltage at a constant value.

This power converter may, for example, be included in a variable speed drive including an inverter stage (not represented) connected to its DC power supply bus and provided with a number of controlled switching arms used to chop the DC voltage and obtain a variable voltage intended to power an electric load.

Hereinafter in the description, a distinction will be made between the real rectified voltage designated $V_{red}$ which is the voltage actually applied as output from the rectifier stage 1 and a hypothetical rectified voltage designated $V_r$ which corresponds to the voltage that would be applied as output from the rectifier stage 1 if the rectifier stage 1 was always operating in continuous conduction mode. Since the voltage $V_r$ is hypothetical, it is not represented in FIG. 1.

According to the invention, the power converter employs a controlled current source connected in series to the first or the second power supply line of the DC power supply bus, upstream of the bus capacitor. This controlled current source is intended to control the current $I_{red}$ flowing on the DC power supply bus as output from the rectifier stage 1, this current $I_{red}$ hereinafter being designated rectifier current.

This controlled current source for example takes the form of a controlled electronic inductance including:
- a low value DC inductance (L),
- a controlled variable voltage source taking the form of an electronic converter 2 consisting of two distinct switching arms in parallel and a capacitor C1 connected in parallel with the two switching arms.

Since the rectifier stage 1 of the power converter is non-reversible, the switching arms of the electronic converter can be unidirectional in current and each include, for example, an electronic switch T1, T2 connected in series with a diode D1, D2. Each switching arm includes a connection mid-point P1, P2 situated between its electronic switch T1, T2 and its diode D1, D2. The connection mid-point P1 of the first switching arm is connected to the inductance L and the connection mid-point P2 of the second switching arm is connected to the bus capacitor $C_{bus}$. On one switching arm of the electronic converter 2, the series arrangement of the electronic switch and of the diode is offset relative to that of the other switching arm.

Figure 2:
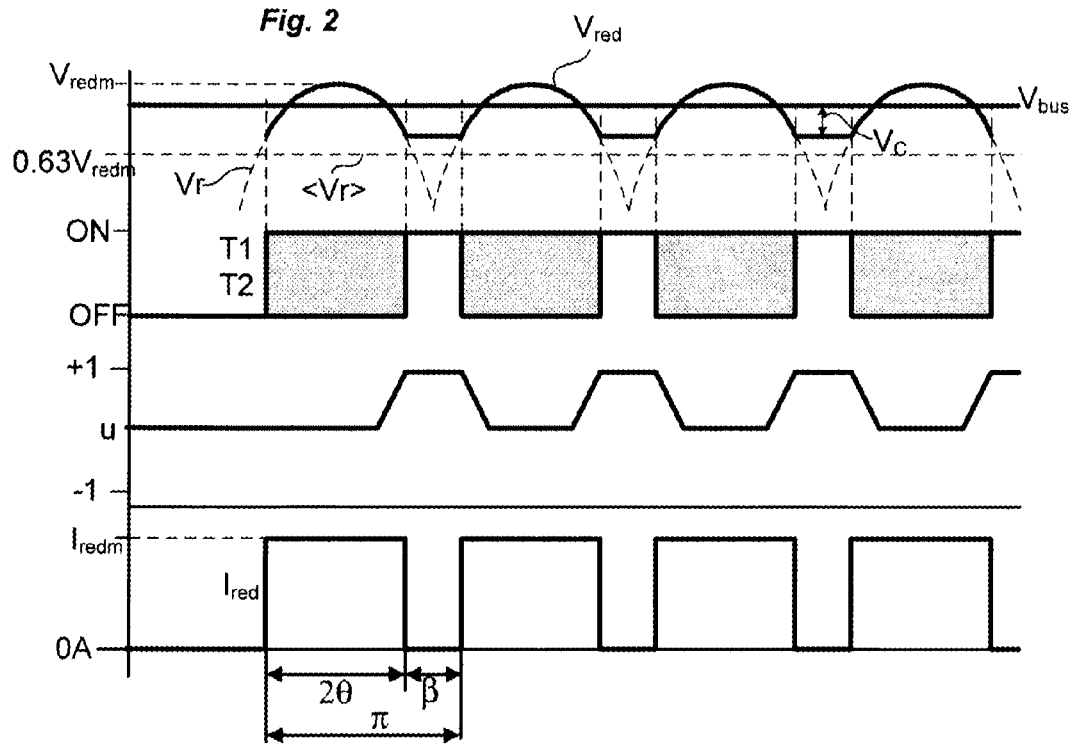
FIG. 2 illustrates, by different curves, the principle of operation of the invention.

The electronic switches T1, T2 employed in the electronic converter 2 are, for example, MOSFET-type transistors controlled by suitable control means 3, employing, for example, a PWM (pulse width modulation) control. Other components suitable for fulfilling the same function can obviously be employed. The control of the two switches by PWM entails comparing two saw tooth wave-form signals that are synchronized and in phase opposition with a constant control signal (commonly called modulant) in order to deduce the switching instants and durations of each of the switches of the electronic converter. For simplicity, as represented in FIG. 2, it is possible to define that the resultant control u varies between −1 and +1 depending on the state of each of the two switches T1, T2, which makes it possible to obtain a voltage value $V_{aux}$ at the terminals of the electronic converter 2 lying within the range $[-V_c, V_c]$.

The electronic converter 2 thus behaves like a controlled variable voltage source that can be used to modulate the voltage $V_c$ at the terminals of the capacitor C1 of the electronic converter 2 and thus obtain the voltage $V_{aux}$ at the terminals of this electronic converter 2.

The following relationship is thus obtained between the voltage $V_{bus}$ of the DC power supply bus, the voltage $V_L$ at the terminals of the inductance L, the voltage $V_{aux}$ at the terminals of the controlled electronic converter 2 and the voltage $V_{red}$ of the rectifier stage 1:

$$V_L = V_{red} - V_{bus} - V_{aux} \quad (1)$$

By controlling the voltage $V_{aux}$ at the terminals of the electronic converter 2, it is thus possible to vary the voltage $V_L$ and thus control the rectifier current $I_{red}$ and impose a particular profile thereon. To obtain a continuous rectifier current $I_{red}$, the electronic converter 2 is controlled in a so-called continuous operating mode that is applied to the rectifier stage and in which the voltage $V_C$ at the terminals of the capacitor C1 must always satisfy the following condition:

$$V_C \geq |V_{red}(t) - V_{bus}(t)| \text{ with } <V_{bus}> = <V_{red}> \quad (2)$$

$<V_{bus}>$ defining the average voltage of the DC power supply bus and $<V_{red}>$ the average rectified voltage.

However, this so-called continuous operating mode is not suitable for operating the power converter when the latter is connected in single-phase mode because the voltage $V_{bus}$ of the DC power supply bus that is obtained is insufficient to control the load. Obviously, the connection in single-phase mode may be planned from the outset or result from the loss of a phase, for example by a breakdown of a diode of the rectifier stage 1.

When the power converter is connected to the electricity network in single-phase mode, it is thus necessary to make it operate in a discontinuous operating mode in which the voltage $V_C$ at the terminals of the capacitor C1 of the electronic converter 2 no longer satisfies the above condition, in other words:

$$V_C < \max|V_r(t) - V_{bus}(t)| \quad (3)$$

$V_r(t)$ is then the theoretical rectified voltage of the network. When the rectifier stage 1 is conducting, the voltage $V_r$ is the same as the real rectified voltage $V_{red}$ (FIG. 2). When the rectifier stage 1 blocks the passage of the rectifier current, the voltage $V_r$ is no longer the same as the real rectified voltage $V_{red}$.

According to the invention, to force this discontinuous operating mode, it is necessary to introduce a saturation of the control u of the switches T1, T2 of the electronic converter 2. Thus, as represented in FIG. 2, the electronic converter 2 is then controlled by alternating a modulation of the control u of the switches T1, T2 of the electronic converter 2 with a saturation of this control u.

As is known, the control u of the electronic converter is modulated when the electronic switches T1, T2 of the converter vary between the ON state and the OFF state. The control u is then situated between −1 and +1. The control u of the electronic converter is saturated when the electronic switches T1, T2 of the converter are blocked in the ON state or blocked in the OFF state. The control u is then held at −1 or at +1. Hereinafter in the description, the interest will be focussed more particularly on the case where the switches are blocked in the ON state.

Let us assume, for example, that the switches T1, T2 of the electronic converter are blocked in the ON state for a shrewdly determined time, the voltage $V_{aux}$ at the terminals of the electronic converter 2 will then be equal to $-V_C$. As represented in FIG. 2, over the saturation duration, the average value of the voltage $V_C$ is added to the rectified voltage $V_{red}$ to form the voltage $V_{bus}$ of the DC power supply bus. The result of this is an overall increase in the voltage $V_{bus}$ of the DC power supply bus which becomes greater than 93% of the peak network voltage. Over the saturation duration, since the voltage $V_{bus}$ of the DC power supply bus is greater than the rectified voltage $V_{red}$, this leads to a blocking of the rectifier stage 1 and therefore a cancelling of the rectifier current ($I_{red}$=0A). In FIG. 2, it can be seen that, on each saturation of the control u, the rectifier current $I_{red}$ is cancelled and that the introduction of a saturation and therefore the switch to discontinuous operating mode leads to an increase in the voltage $V_{bus}$ which becomes greater than the average voltage $<Vr>$ (represented in dotted lines in FIG. 2).

During a period of the rectified network voltage, the modulation time and the saturation time of the control are determined by the control means 3 of the electronic converter 2 so as to be in discontinuous operating mode.

With reference to FIG. 2, the following parameters are defined:
- modulation time is defined on the basis of a modulation angle θ and has the value 2θ,
- the saturation time is defined on the basis of a saturation angle β and has the value β,
- the switching period is defined by the period angle which has the value π/n (n=3 for a three-phase network and n=1 for a single-phase network). The period π/n, the modulation angle θ and the saturation angle β are linked by the expression β=π/n−2θ.

The modulation angle θ determines the values of the voltage $V_C$ at the terminals of the capacitor C1 of the electronic converter 2 and of the voltage $V_{bus}$ of the DC power supply bus according to the following relationships:

$$V_{bus} = V_{redm} \cdot \frac{\sin\theta}{\theta} \qquad (4)$$

$$V_C = V_{redm} \cdot \left( \frac{\sin\theta}{\theta} - \cos\theta \right) \qquad (5)$$

In which $V_{redm}$ corresponds to the peak rectified voltage which is equal to the peak network voltage $V_{resm}$.

The peak rectifier current $I_{redm}$ defines the modulation angle θ as a function of the load current $I_L$ intended to power the electric load according to the following relationship:

$$\theta = \frac{I_L}{I_{redm}} \cdot \frac{\pi}{2 \cdot n} \qquad (6)$$

From this relationship, it is deduced that if $$\theta < \frac{\pi}{2 \cdot n},$$

the load current $I_L$ is always less than the peak rectifier current $I_{rm}$, thus necessarily resulting in a discontinuous operating mode.

For a single-phase network n=1 ⇒ θ<π/2

The control of the modulation angle θ is imposed by one of the three variables of the system, namely:
- the peak rectifier current $I_{redm}$,
- the voltage $V_C$ at the terminals of the capacitor C1,
- the voltage $V_{bus}$ of the DC power supply bus.

Figure 3:
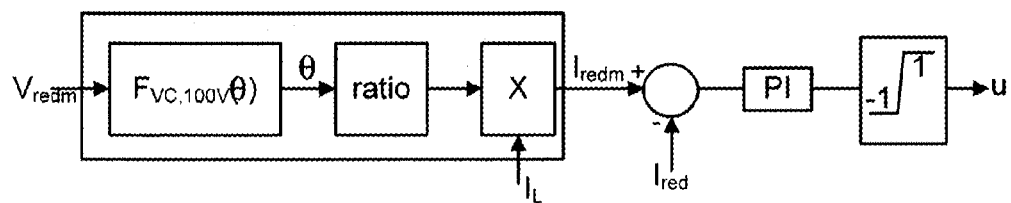
FIG. 3 is a block diagram of a regulation loop suited to a power converter connected in single-phase mode.

The control principle is therefore to obtain the saturation of the control u. Different regulator architectures can be employed to achieve this objective. FIG. 3 shows an exemplary architecture which makes it possible to meet this objective.

FIG. 3 shows a regulation loop PI (proportional-integral) of the rectifier current $I_{red}$. This regulation loop is adapted for the operation of a power converter connected in single-phase mode.

In this regulation loop:
- the peak rectified voltage $V_{redm}$ is applied as input and makes it possible to determine the modulation angle according to the formula (5):

$$V_C = V_{redm} \cdot \left( \frac{\sin\theta}{\theta} - \cos\theta \right),$$

- the voltage VC at the terminals of the capacitor C1 not being, for example, greater than 100 volts,
- from the modulation angle θ and from a measurement or a determination of the load current $I_L$, the peak rectifier current $I_{redm}$ is deduced therefrom on the basis of the relationship (6):

$$Irm = I_L \cdot \frac{\pi}{2 \cdot \theta}.$$

The modulation angle θ is obviously imposed so that the peak rectifier current $I_{redm}$ is greater than the load current $I_L$ so as to saturate the control u and therefore to obtain a discontinuous operating mode.

Figure 4:
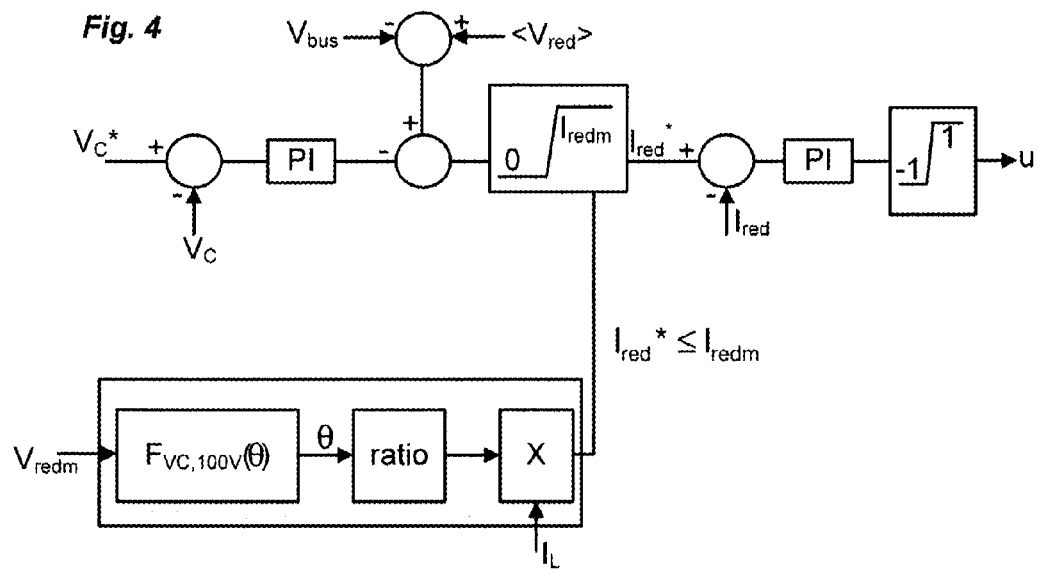
FIG. 4 is a block diagram of a regulation loop suited to a power converter connected in three-phase mode.

This regulation loop may be implanted in a wider regulation loop adapted to operation of a power converter connected in three-phase mode as represented in FIG. 4. In this FIG. 4, the regulation loop described above makes it possible to determine the peak rectifier current $I_{redm}$. The second regulation loop makes it possible to determine the set point of the rectifier current $I_{red}^*$ using a regulator PI applied to the voltage $V_C$ at the terminals of the capacitor C1 of the electronic converter 2. The set point $V_C^*$ of the voltage at the terminals of the capacitor C1 is set so that the rectifier current $I_{red}$ is in continuous conduction as long as the power converter is connected in three-phase mode. The above relationship (2) will thus always be satisfied.

On the other hand, if a loss of phase occurs, the voltage $V_C$ then increases beyond the set point $V_C^*$ and saturates the regulator PI. The rectifier current set point $I_{red}^*$ is then limited to the peak rectifier current $I_{redm}$. The situation is then the same as the case of the control of the converter connected in single-phase mode.

Obviously, it is possible, without departing from the framework of the invention, to imagine other variants and refinements of detail and even consider the use of equivalent means.

The invention claimed is:

1. A power converter comprising:
a rectifier stage connected to a number of input phases of a network delivering an input current and to which is applied a rectified voltage and at the output of which is obtained a current, called rectifier current;
a DC power supply bus connected to the rectifier stage and including a first power supply line and a second power supply line to each of which is applied an electrical potential in order to obtain a voltage on the DC power supply bus;
a bus capacitor connected to the first power supply line and to the second power supply line;
a controlled current source situated on the first power supply line or the second power line, upstream of the bus capacitor, said controlled current source including an inductance and an electronic converter including a capacitor and two switching arms; and
control means for controlling the two switching arms of the electronic converter to modulate a voltage at the terminals of the capacitor in order to obtain, at each instant, a determined voltage at the terminals of the electronic converter,
wherein the control means are arranged to obtain a discontinuous operating mode of the rectifier stage by alternation of a modulation phase of the switching arms with a saturation phase in which the two switching arms are simultaneously kept conducting, said saturation phase being applied for a determined duration $\beta$ so as to keep the voltage at the terminals of the capacitor of the electronic converter below the maximum absolute value of the difference between the rectified voltage and the voltage applied to the DC power supply bus and to increase the average value of the voltage applied to the DC power supply bus.

2. The power converter according to claim 1, wherein the control means are arranged to implement a regulation loop intended to determine a control of the switching arms of the electronic converter.

3. The power converter according to claim 1 or 2, wherein the duration $\beta$ of the saturation phase is determined on the basis of the following relationships:

$$\theta = \frac{I_L}{I_{redm}} \cdot \frac{\pi}{2 \cdot n} \text{ and } \beta = \pi/n - 2\theta$$

in which $\theta$ represents the duration of the modulation phase, $\beta$ represents the duration of the saturation phase, n corresponds to the number of input phases to which the power converter is connected, $I_L$ is the current flowing on the DC power supply bus, downstream of the bus capacitor, $I_{redm}$ corresponds to the peak rectifier current.

4. The power converter according to claim 3, wherein the discontinuous operating mode is obtained when $$\theta < \frac{\pi}{2 \cdot n}.$$

5. A variable speed drive including an inverter stage provided with switching arms intended to convert a DC voltage into a variable voltage intended to power an electric load comprising, upstream of its inverter stage, a power converter as defined in claim 1.

* * * * *